US010527399B2

(12) United States Patent
Riesemann et al.

(10) Patent No.: US 10,527,399 B2
(45) Date of Patent: Jan. 7, 2020

(54) SCANNING UNIT FOR SCANNING A SCALE AND POSITION-MEASURING DEVICE

(71) Applicant: DR. JOHANNES HEIDENHAIN GmbH, Traunreut (DE)

(72) Inventors: Bernhard Riesemann, Taching (DE); Wolfgang Pucher, Rettenbach (DE); Stefan Kuehnhauser, Taching (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 332 days.

(21) Appl. No.: 14/315,371

(22) Filed: Jun. 26, 2014

(65) Prior Publication Data

US 2015/0008897 A1 Jan. 8, 2015

(30) Foreign Application Priority Data

Jul. 3, 2013 (DE) .......................... 10 2013 213 003

(51) Int. Cl.
*G01B 7/00* (2006.01)

(52) U.S. Cl.
CPC .................................. *G01B 7/003* (2013.01)

(58) Field of Classification Search
CPC .......... G01B 7/003; G01B 7/001; G01B 7/00; G01D 11/245; G01D 11/24; G01D 13/12; G01D 13/20; G01D 5/34707; G01D 5/34753; G01D 5/24442; G01D 5/34715; H01R 13/565; H01R 13/56; H01R 13/562; H01R 35/00; H01R 35/04; G01R 12/88

USPC .............. 324/76.11, 750.16, 750.23, 754.23; 439/11, 13–30; 356/614–624; 33/700–708, 495, 496
See application file for complete search history.

(56) References Cited

U.S. PATENT DOCUMENTS 3,816,003 A * 6/1974 Litke .................. G01D 5/34753
33/707
3,867,037 A * 2/1975 Litke ...................... G01B 11/00
33/707
(Continued)

FOREIGN PATENT DOCUMENTS

DE 4034425 A1 4/1992
DE 19918652 * 10/2000 ............. H01R 35/04
(Continued)

OTHER PUBLICATIONS

English Machine Translation of Berger et al. DE 19918652.*
Machine Translation of EP 2253940.*

*Primary Examiner* — Lee E Rodak
(74) *Attorney, Agent, or Firm* — Leydig, Voit & Mayer, Ltd.

(57) ABSTRACT

A scanning unit adapted for scanning a measuring graduation of a scale for purposes of position measurement in a measurement direction includes a housing having a detector configured to generate position-dependent scanning signals. An electrical lead passes out through the housing in the measurement direction. A rotatable member, in which the electrical lead is routed, has a first section extending in the measurement direction and a second section extending in a second direction at an angle relative to the measurement direction. The rotatable member is rotatably mounted on the housing about an axis of rotation extending in the measurement direction.

15 Claims, 5 Drawing Sheets

(56) References Cited

U.S. PATENT DOCUMENTS

| | | | | |
|---|---|---|---|---|
| 4,484,391 | A | * | 11/1984 | Narimatsu ............ G01D 11/245 324/207.24 |
| 4,564,294 | A | * | 1/1986 | Ernst ...................... G01B 3/002 250/237 G |
| 4,818,111 | A | * | 4/1989 | Affa ........................ G01D 5/347 250/237 G |
| 5,092,793 | A | * | 3/1992 | Stephan ................. H01R 35/00 174/46 |
| 5,175,456 | A | * | 12/1992 | Neff ..................... H02K 41/035 29/834 |
| 5,277,590 | A | * | 1/1994 | Thomas ............... H01R 13/646 439/20 |
| 5,499,932 | A | * | 3/1996 | Tanaka ...................... G01P 1/02 439/446 |
| 5,635,833 | A | * | 6/1997 | Onodera ................. G01B 3/004 324/207.22 |
| 6,030,119 | A | | 2/2000 | Tachibana et al. |
| 6,641,436 | B2 | * | 11/2003 | Baffert ................. H01R 9/0518 439/582 |
| 7,102,078 | B2 | * | 9/2006 | Weber ................... G01D 11/245 174/50 |
| 7,186,133 | B1 | * | 3/2007 | Szczesny ............. H01R 13/565 439/446 |
| 7,435,090 | B1 | * | 10/2008 | Schriefer ................ H01R 35/04 439/11 |
| 8,001,700 | B2 | | 8/2011 | Tondorf et al. |
| 2009/0141276 | A1 | * | 6/2009 | Tondorf ............. G01D 5/34715 356/401 |
| 2013/0062513 | A1 | * | 3/2013 | Gruber ............... G01D 5/34715 250/231.1 |
| 2015/0143902 | A1 | * | 5/2015 | Anselment ........... G01D 11/245 73/431 |

FOREIGN PATENT DOCUMENTS

| | | | |
|---|---|---|---|
| DE | 19918652 | A1 | 10/2000 |
| EP | 0818854 | A1 | 1/1998 |
| EP | 2068125 | A2 | 6/2009 |
| EP | 2253940 | * | 11/2010 ............ G01D 11/24 |
| JP | H 0424084 | U | 2/1992 |
| JP | 04198714 | A | 7/1992 |
| JP | H 0660101 | U | 8/1994 |
| JP | 2508270 | Y2 | 8/1996 |
| JP | H 092223876 | A | 8/1997 |
| JP | H 10277028 | A | 10/1998 |
| JP | H 11220519 | A | 8/1999 |
| JP | H 11230975 | A | 8/1999 |
| JP | 2002044905 | A | 2/2002 |
| JP | 2005210837 | A | 8/2005 |
| JP | 200678222 | A | 3/2006 |
| JP | 2008091318 | A | 4/2008 |
| JP | 200928773 | A | 2/2009 |
| JP | 2009301903 | A | 12/2009 |
| JP | 2011114475 | A | 6/2011 |
| JP | 2011150891 | A | 8/2011 |
| JP | 2013072742 | A | 4/2013 |

* cited by examiner

B-B

D-D

SCANNING UNIT FOR SCANNING A SCALE AND POSITION-MEASURING DEVICE

CROSS-REFERENCE TO PRIOR APPLICATION

Priority is claimed to German Patent Application No. DE 10 2013 213 003.1, filed on Jul. 3, 2013, the entire disclosure of which is hereby incorporated by reference herein.

FIELD

The present invention relates to a scanning unit for scanning a scale and to a position-measuring device having such a scanning unit.

Such scanning units and position-measuring devices are used, for example, in machine tools and increasingly also in the semiconductor industry for measuring displacements, angles and speeds. The requirements in this connection are increasingly aimed at a space-saving design for the scanning unit and the position-measuring device.

BACKGROUND

A scanning unit and position-measuring device are known from EP 2 068 125 A2. The position-measuring device is made up of two independently manipulable units, namely a scanning unit and a scale. For purposes of position measurement in a measurement direction X, the scanning unit is movable relative to the scale in this measurement direction X, and the scale extends in measurement direction X.

The scanning unit contains a detector for generating position-dependent electrical scanning signals during scanning of the scale extending in measurement direction X. An electrical lead is passed through the housing of the scanning unit to allow the scanning signals to be led out.

As shown in FIG. 1 of EP 2 068 125 A2, a plurality of outer surfaces of this scanning unit are designed as potential mounting surfaces by providing mounting holes in these outer surfaces. The direction of the cable can be adapted to the current mounting situation by bending the cable. However, the permissible bend radius of the cable is relatively large, and the bending results in forces being transmitted onto the scanning unit, thereby adversely affecting the measuring accuracy of the position-measuring device. Moreover, selection of a small bend radius may lead to damage to the cable and/or to the stranded conductors extending therewithin.

Japanese Patent Publication JP 04-198714 A1 attempts to solve this problem by providing a socket for attachment of a cable on each of a plurality of outer surfaces of the scanning unit, which are oriented perpendicular to one another. This allows the direction of the outgoing cable to be variably adapted to the existing mounting situation.

The drawback here, however, is that providing a plurality of sockets on the housing of the scanning unit significantly increases the effort required to provide reliable sealing. In addition, a relatively large mating plug is needed to create a reliable plug-and-socket connection.

SUMMARY

In an embodiment, the present invention provides a scanning unit adapted for scanning a measuring graduation of a scale for purposes of position measurement in a measurement direction. The scanning unit includes a housing having a detector configured to generate position-dependent scanning signals. An electrical lead passes out through the housing in the measurement direction. A rotatable member, in which the electrical lead is routed, has a first section extending in the measurement direction and a second section extending in a second direction at an angle relative to the measurement direction. The rotatable member is rotatably mounted on the housing about an axis of rotation extending in the measurement direction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
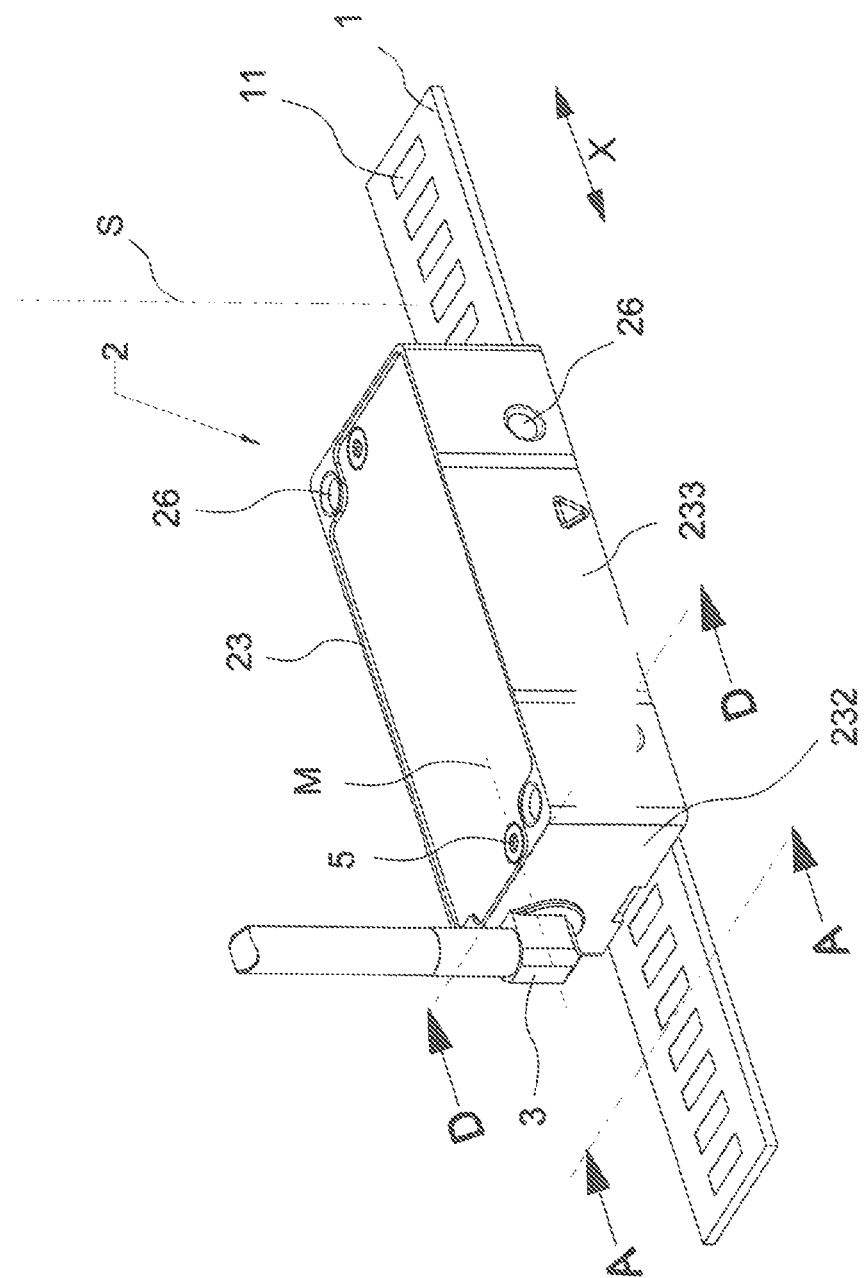
FIG. 1 is a perspective view of a position-measuring device according to an embodiment of the present invention.
Figure 2:
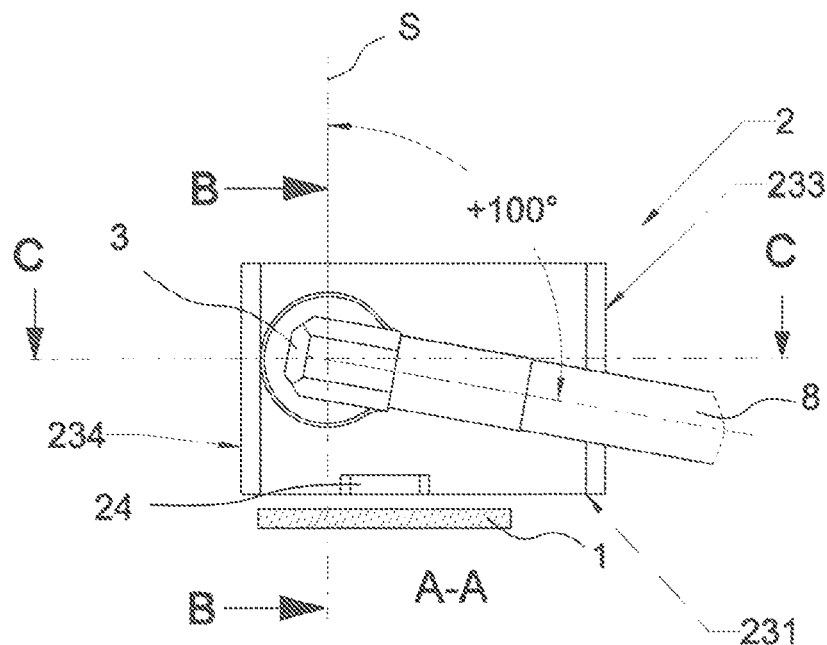
FIG. 2 is a cross-sectional view along line A-A of the position-measuring device of FIG. 1, showing the rotatable member in a first rotational position.
Figure 3:
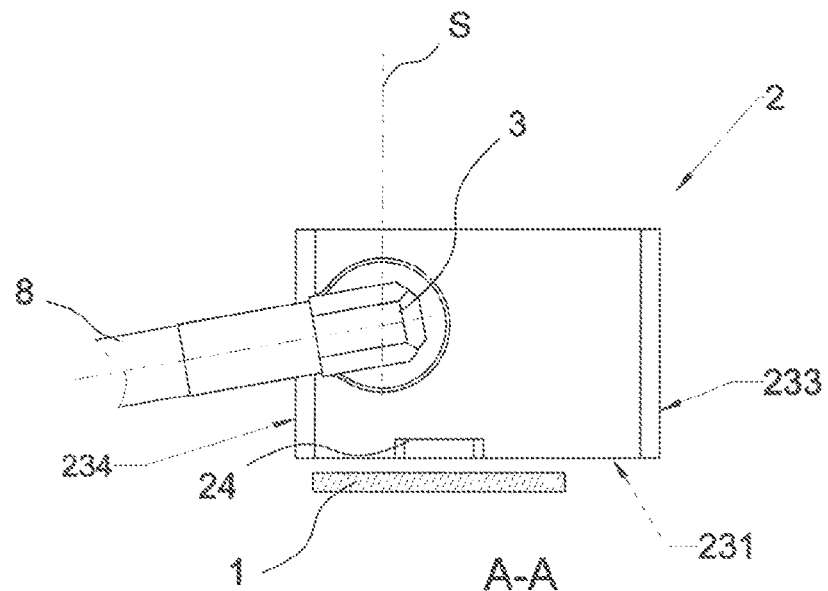
FIG. 3 is a cross-sectional view along line A-A of the position-measuring device of FIG. 1, showing the rotatable member in a second rotational position.
Figure 4:
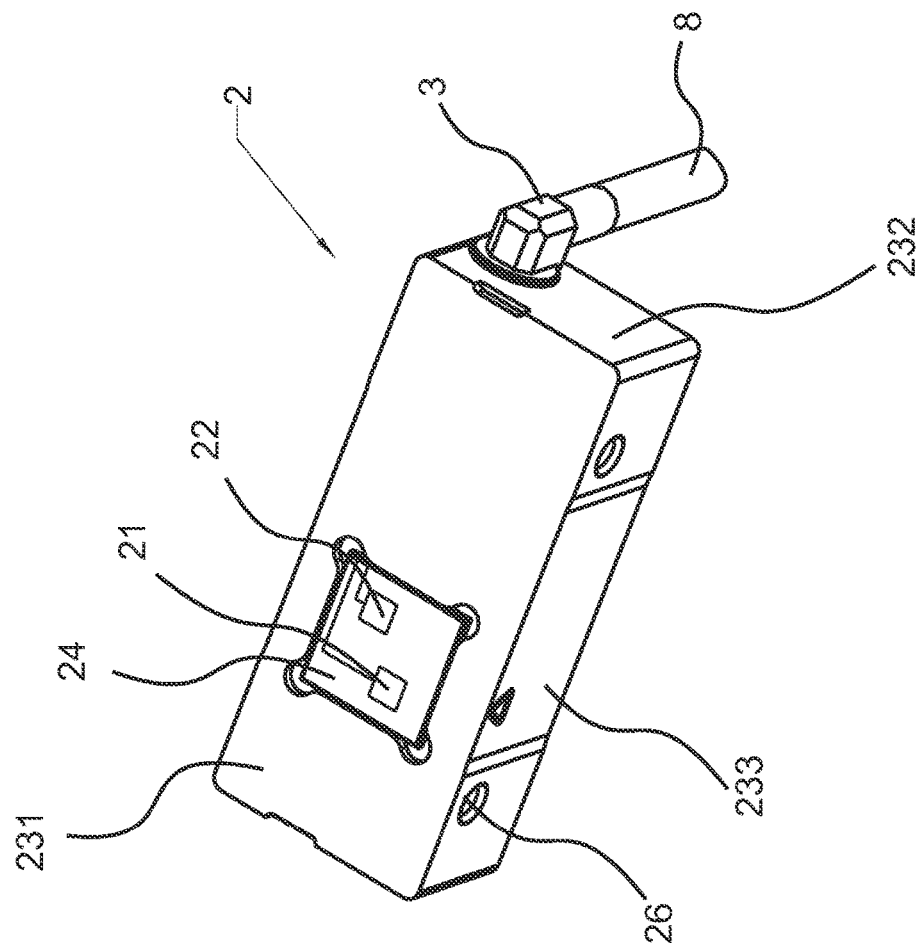
FIG. 4 is another view showing the scanning unit of the position-measuring device of FIG. 1.

In an embodiment, the present invention provides a scanning unit and a position-measuring device configured to enable easy and space-saving adaptation to the existing mounting situation, while ensuring accurate position measurement in each mounting situation.

The scanning unit designed in accordance with an embodiment of the present invention is adapted for scanning a scale for purposes of position measurement in a measurement direction.

The scanning unit includes a housing having a detector for generating position-dependent scanning signals during scanning of the scale in the measurement direction. The detector is disposed in the interior of the housing and enclosed by the housing.

In order to supply power to the scanning unit and/or to lead out the position-dependent scanning signals, the scanning unit has an electrical lead that passes out through the housing in the measurement direction. This electrical lead is routed in a rotatable member having a first section extending in the measurement direction and a second section extending in a second direction at an angle relative to the measurement direction. The rotatable member is rotatably mounted on the housing about an axis of rotation that also extends in the measurement direction.

Advantageously, in an embodiment, the second section of the rotatable member is angled at 90° with respect to the first section, which allows the leads to be routed in a particularly space-saving manner.

The scanning unit is preferably designed as an independent unit that can be associated with the scale to be scanned.

The scale and the scanning unit together form the position-measuring device, which preferably takes the form of a length-measuring device having a linearly extending scale.

However, the scanning unit may also be associated with a scale that extends along a curved path. The scale may be a tape attached to the outer or inner periphery of a carrier, for example, by tensioning or adhesive bonding. In this case, the scale and the scanning unit form an angle-measuring device. In this position-measuring device, the measurement direction is defined by the circumferential direction or the tangent at the scanning location on the scale.

The scanning unit is preferably provided with a rotation stop that limits the angle of rotation of the rotatable member relative to the housing. Preferably, the rotation stop limits the rotatability of the rotatable member in such a way that the second section of the rotatable member can only be moved into rotational positions within a pivoting range of ±100° relative to a normal to the surface of the scale to be scanned.

The housing preferably has at least one outer surface that extends parallel to the measurement direction and is designed for attachment to an object to be measured. Designing the at least one outer surface of the housing as a mounting surface for attachment to an object to be measured is achieved, in particular, by forming mounting holes therein which extend perpendicular to this mounting surface. These mounting holes may be through-holes or blind holes and provided with an internal thread.

The at least one mounting surface of the housing that is designed for attachment purposes is preferably a flat surface defined by the measurement direction and a normal to the scale surface to be scanned.

In particular, two opposite, parallel outer surfaces of the housing are designed as mounting surfaces, so that the second section of the rotatable member can be moved into at least two rotational positions by rotation about the axis of rotation, where in the first rotational position, the second section points at a right angle away from one of these two mounting surfaces, and in the second rotational position, the second section points at a right angle away from the other of the two mounting surfaces.

A particularly advantageous embodiment of the scanning unit is obtained when the outer contour of the housing is cuboid in shape. Thus, a plurality of outer surfaces extending in the measurement direction are provided which may be alternatively used as mounting surfaces.

In order to axially secure the rotatable member on the housing, a pull-out protection is provided between the housing and the rotatable member. This axially acting pull-out protection may take the form of at least one pin that extends in the housing perpendicular to the axis of rotation of the rotatable member and corresponds with a circumferential groove in the rotatable member. This pin is preferably a tension pin.

It is advantageous if the rotatable member is lockable by a locking element in a selected rotational position on the housing. This allows the user to optimally adapt the desired exit direction of the lead to the current mounting situation and to fix the rotatable member in this rotational position on the housing. The rotational position can be fixed by a screw (e.g., a grub screw) that can be threaded into the housing and manipulated from outside. It is particularly advantageous if the screw can be manipulated from the outer surface of the housing that is opposite and parallel the outer surface having the scanning window.

The interior of the housing is sealed from the exterior by a peripheral seal. To this end, the first section of the rotatable member, which is rotatably mounted on the housing, has a round outer contour that is sealed by a sealing ring, in particular an O-ring, against a circular inner contour of the housing.

The housing and/or the first section of the rotatable member has/have an annular groove for receiving the sealing ring.

The sealing ring is located closer to the interior of the housing than the externally manipulable locking element in the form of, for example, a grub screw.

The leads routed to the end of the second section of the rotatable member may there be connected to a plug-and-socket connection. However, a particularly space-saving connection is achieved if a cable is connected to the second section of the rotatable member, and if the leads routed within the rotatable member are stranded conductors of this cable. In this embodiment, the rotatable member is electrically conductively connected, in particular by a crimp barrel, to a shield of the cable, and this crimp barrel surrounds a jacket of this cable. In this way, the crimp barrel fixes the cable to the rotatable member. Fixing or attaching the cable by circumferentially clamping it to the rotatable member by means of the crimp barrel also provides a seal between the cable and the rotatable member.

The present invention is illustrated in FIGS. 1 through 7 using the example of a position-measuring device in the form of a length-measuring device, and will be described in detail hereinafter. This length-measuring device includes a scale 1 and a scanning unit 2 that can be associated with this scale 1 as an independent unit. Scale 1 has a measuring graduation 11, which can be photoelectrically scanned by scanning unit 2. In the example, measuring graduation 11 is embodied as a reflective incremental graduation. Scale 1 extends in measurement direction X, and scanning unit 2 is movable relative to scale 1 in this measurement direction X. For purposes of position measurement, scanning unit 2 includes a light source 21 and a detector 22. During position measurement, a light beam emanating from light source 21 is modulated by measuring graduation 11 as a function of position. The light beam modulated as a function of position is sensed by detector 22, which then generates position-dependent electrical scanning signals.

Scanning unit 2 includes a housing 23, which encloses light source 21 and detector 22. The outer contour of housing 23 is cuboid in shape. One of the outer surfaces 231 so-formed has a scanning window 24, which is located opposite scale 1. Scanning window 24 is transparent to the scanning beam, but seals housing 23 from dirt. Scanning window 24 is made, for example, from glass. Another outer surface 232 extending perpendicular thereto is provided with an opening through which the electrical leads 25 pass from the interior of housing 23 to the outside. Via these electrical leads 25, the electrical scanning signals of detector 22 can be led out and/or a supply voltage can be fed to scanning unit 2.

Electrical leads 25 are routed in a rotatable member 3. This rotatable member 3 has a first tubular section 31 extending straight in measurement direction X. Furthermore, this first section 31 is rotatably mounted in the opening of housing 23 with the axis of rotation M extending in measurement direction X. Rotatable member 3 further has a second section 32 which is angled, advantageously at 90°, with respect to the first section 31.

By providing the mounting point of rotatable member 3 in the form of a bearing directly in a housing wall of scanning unit 2, a space-saving arrangement is achieved for rotatable member 3. The measure according to which first section 31 of rotatable member 3 extends in measurement direction X has the advantage that the space available for movement of scanning unit 2 above scale 1 is optimally used.

The fact that second section 32 of rotatable member 3 is angled with respect to first section 31, together with the rotatability, provides the particular advantage that the direction of second section 32, and thus the further course of electrical leads 25, can be optimally adapted to the mounting situation of scanning unit 2 without bending forces being exerted on scanning unit 2. It is particularly advantageous to angle second section 32 at 90° with respect to first section 31, because this reduces the space required for wire routing and allows electrical leads 25 to be led away from scanning unit 2 along the shortest possible path.

Cuboidal housing 23 of scanning unit 2 has a first outer surface 233 which extends parallel to measurement direction X and is designed as a mounting surface by which scanning unit 2 may be mounted to an object to be measured, such as, for example, a linear axis of a machine. For this purpose, this outer surface 233 has mounting holes 26 formed therein which extend perpendicular thereto. This first outer surface 233 extends at a right angle to the outer surface 231 having the scanning window 24. The two outer surfaces 233 and 234 are flat surfaces that are each defined by measurement direction X and a normal S to the outer surface 231 or to the scale surface to be scanned at the scanning location.

Housing 23 is formed with another outer surface 234 that extends parallel to measurement direction X and parallel to first outer surface 233, and is designed as a second mounting surface. First outer surface 233 and second outer surface 234 may be alternatively selected by the user for attachment of scanning unit 2 to an object to be measured. In order to be able to provide for space-saving routing of electrical leads 25 in each case, second section 32 of rotatable member 3 is movable into at least two rotational positions by rotation about axis of rotation M. In the first rotational position, second section 32 of rotatable member 3 points at a right angle away from first outer surface 233, and in the second rotational position, second section 32 of rotatable member 3 points at a right angle away from second outer surface 234.

Figure 7:
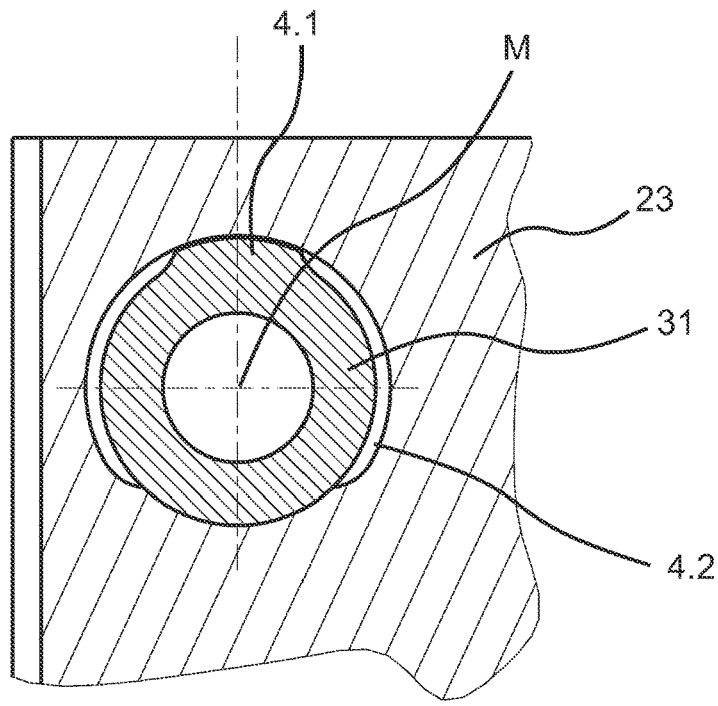
FIG. 7 is a part-sectional view along line D-D of the scanning unit of the position-measuring device according to FIG. 1.

The angle of rotation of rotatable member 3 is limited by a rotation stop 4. An exemplary embodiment of this rotation stop 4 is shown in FIG. 7 and denoted by reference numerals 4.1 and 4.2. First section 31, which is rotatably mounted in a wall of housing 23, is provided with a nose 4.1 that corresponds with an annular groove 4.2 of housing 23. This groove 4.2 does not extend through 360°, and therefore forms a stop for nose 4.1. In order to protect scale 1, rotation stop 4 limits the rotatability of rotatable member 3 in particular in such a way that second section 32 of rotatable member 3 can only be moved into rotational positions within a pivoting range between +100° and −100° relative to a normal S to the surface of the scale 1 to be scanned. This normal S is also normal to the outer surface 231 of the housing 23 that has the scanning window 24.

Figure 6:
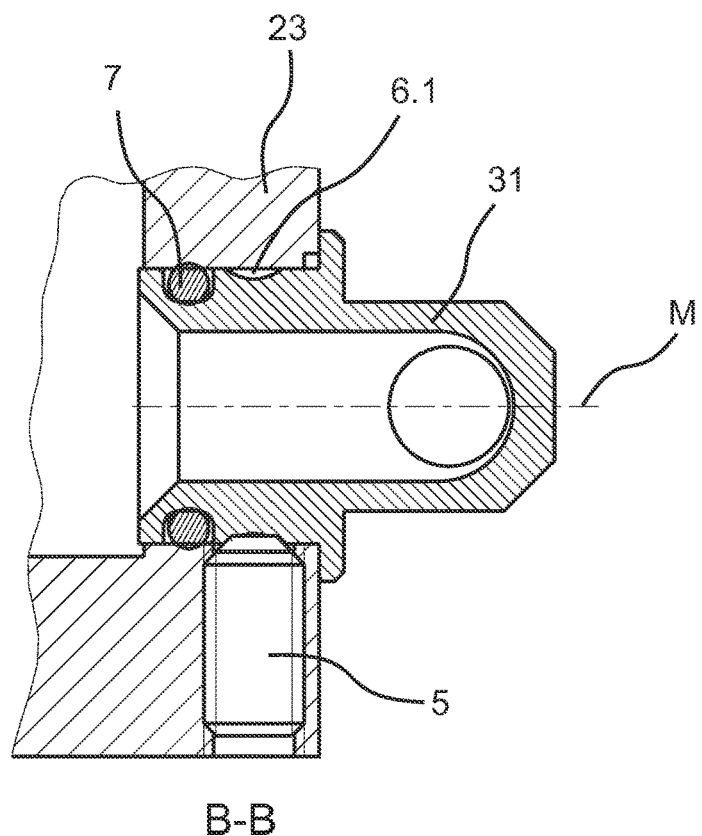
FIG. 6 is a part-sectional view along line B-B of the scanning unit of FIG. 2.

Once the user has moved rotatable member 3 to an optimal rotational position for the current mounting situation, rotatable member 3 may be locked in the selected rotational position on housing 23 by means of a locking element 5. A particularly space-saving locking element 5 is shown in FIG. 6. This locking element is formed by a screw which is threaded into the wall of housing 23 in a direction transverse to the axis of rotation M of rotatable member 3 and which clamps rotatable member 3 in a fixed position on housing 23.

Figure 5:
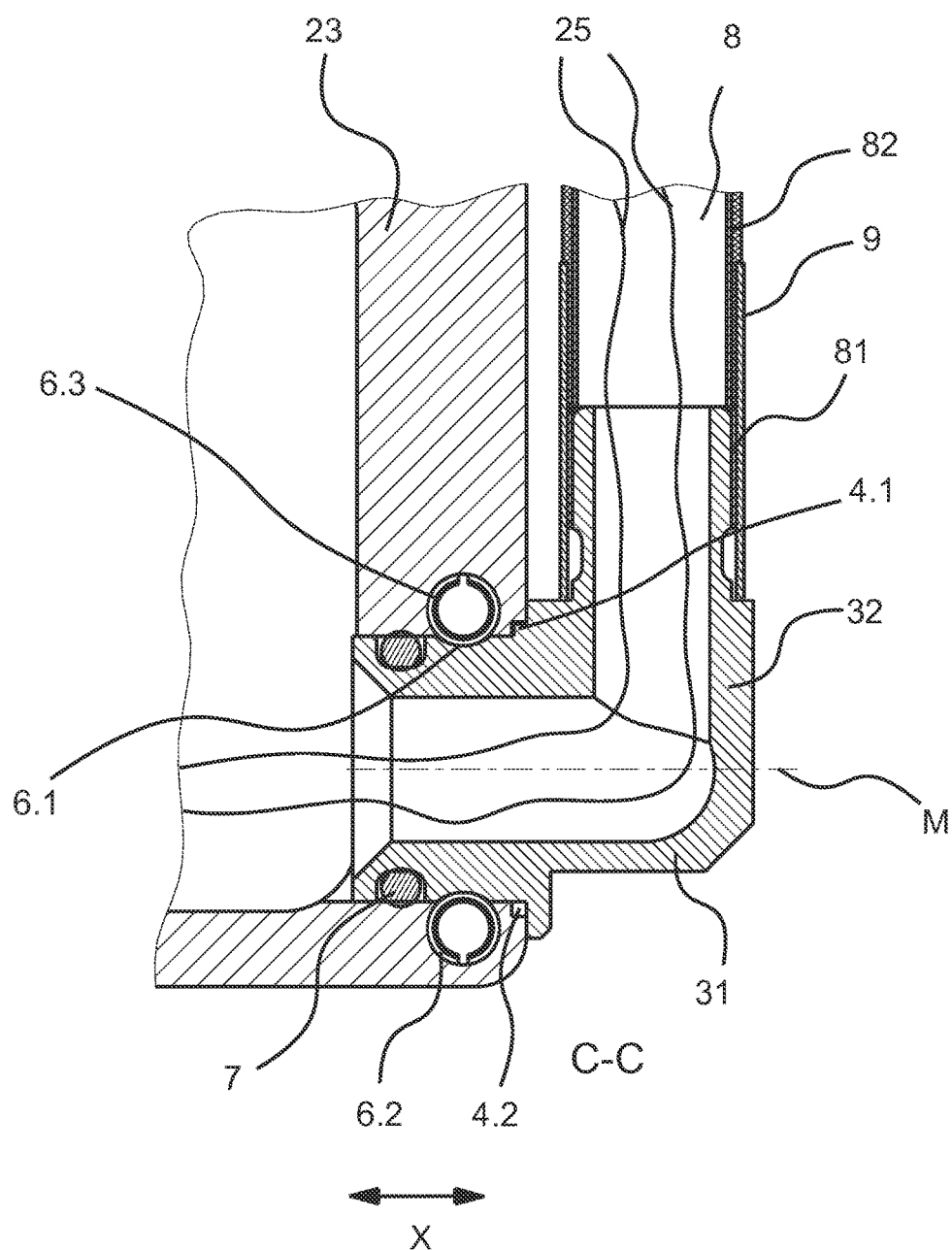
FIG. 5 is a part-sectional view along line C-C of the scanning unit of FIG. 2.

As shown in FIG. 5, the rotatable mounting of rotatable member 3 on housing 23 is accomplished by a circumferential groove 6.1 that is formed in first section 31 of rotatable member 3 and cooperates with pins 6.2, 6.3 extending transverse to the axis of rotation M. These pins 6.2, 6.3 are inserted into the wall of housing 23 that extends transverse to measurement direction X and advantageously take the form of tension pins. Groove 6.1 and pins 6.2, 6.3 together also perform the function of a pull-out protection by interlockingly holding rotatable member 3 in axial position on housing 23.

A seal is provided between rotatable member 3 and housing 23. As shown in the sectional views of FIG. 5 and FIG. 6, this seal is provided by a sealing ring 7 in the form of an O-ring disposed radially between a round outer contour of first section 31 of rotatable member 3 and a round inner contour of housing 23. Sealing ring 7 is located closer to the interior than the externally manipulable locking element 5. This means that sealing ring 7 is disposed axially between the interior of housing 23 and locking element 5. This arrangement provides a reliable sealing of the interior, because locking element 5, which may by formed by the radially inserted screw and the pins 6.2, 6.3, is positioned after sealing ring 7, as viewed from the interior.

Second section 32 of rotatable member 3 may be provided at the end with a cable 8 or a push-fit connector for connection to electrical leads 25. A particularly space-saving continuation of leads 25 is accomplished by means of a cable 8, as illustrated in FIG. 5. In this case, the electrical leads 25 routed within rotatable member 3 are the stranded conductors of cable 8. Cable 8 has a shield 81 which is electrically conductively connected to second section 32 of the rotatable member. Shield 81 preferably takes the form of a braided shield which is placed around the outer periphery of the tubular second section 32 of rotatable member 3. Fixing of shield 81 to rotatable member 3 is by means of a crimp barrel 9. This crimp barrel 9 also surrounds an outer jacket 82 of cable 8, thereby fixing jacket 82, and thus also cable 8, to rotatable member 3. The circumferential crimping zone, where crimp barrel 9 clamps the jacket 82 of cable 8, also acts as a seal between cable 8 and rotatable member 3. Since rotatable member 3 is in contact with housing 23, it is also ensured that housing 23 is electrically connected to the shield 81 of the cable.

In the exemplary embodiment described above, position measurement is based on the photoelectric scanning principle. However, the present invention may also be used with other physical scanning principles, such as such as magnetic, capacitive, or inductive scanning principles. Moreover, the measuring graduation may alternatively or additionally include an absolute coding.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A scanning unit adapted for scanning a measuring graduation of a scale for purposes of position measurement in a measurement direction, wherein the scale is elongated and has a length extending along the measurement direction and wherein the scanning unit is configured to move in the measuring direction along the scale, the scanning unit comprising:
  a housing having a detector configured to generate position-dependent scanning signals;
  an electrical lead that passes out through the housing in the measurement direction; and
  a rotatable member in which the electrical lead is routed, the rotatable member having a first section extending in the measurement direction and a second section extending in a second direction at an angle relative to the measurement direction, wherein the rotatable member is rotatably mounted in an opening of a wall of the housing about an axis of rotation extending in the measurement direction and is configured to move with the scanning unit in the measurement direction for the purposes of position measurement,
  wherein the rotatable member is lockable by a locking element, and wherein the locking element is formed by a screw which is threaded into a wall of the housing such that the rotatable member is clampable by the screw in a selected rotational position on the housing.

2. The scanning unit as recited in claim 1, wherein the second section of the rotatable member extends at 90° relative to the first section.

3. The scanning unit as recited in claim 1, wherein two opposite outer surfaces of the housing that extend in the measurement direction and parallel to each other are designed as first and second mounting surfaces, and wherein the second section of the rotatable member is moveable into at least two rotational positions by rotation about the axis of rotation such that, in a first rotational position, the second section points at a right angle away from the first mounting surface, and, in a second rotational position, the second section points at a right angle away from the second mounting surface.

4. The scanning unit as recited in claim 3, wherein the outer surfaces of the housing are designed as the first and second mounting surfaces for attachment to an object to be measured by having mounting holes, the mounting holes respectively extending perpendicular to the outer surfaces.

5. The scanning unit as recited in claim 1, wherein an outer contour of the housing is cuboid in shape.

6. The scanning unit as recited in claim 1, further comprising a rotation stop disposed so as to limit an angle of rotation of the rotatable member with respect to the housing.

7. The scanning unit as recited in claim 6, wherein the rotation stop is configured to limit the rotatability of the second section of the rotatable member to rotational positions within a pivoting range of ±100° relative to a normal to a surface of the scale to be scanned.

8. The scanning unit as recited in claim 1, wherein an axial pull-out protection is provided between the housing and the rotatable member.

9. The scanning unit as recited in claim 8, wherein the axial pull-out protection includes at least one pin which is inserted into the housing and corresponds with a circumferential groove of the rotatable member.

10. The scanning unit as recited in claim 1, wherein the first section of the rotatable member, which is rotatably mounted in the opening of the wall of the housing, has a round outer contour that is sealed by a sealing ring against a circular inner contour of the housing.

11. The scanning unit as recited in claim 10, wherein the rotatable member is lockable by a locking element in a selected rotational position on the housing, and wherein the sealing ring is disposed before the locking element, as viewed from an interior of the housing.

12. The scanning unit as recited in claim 1, wherein the electrical lead is a stranded conductor of a cable that is connected to the second section of the rotatable member.

13. The scanning unit as recited in claim 12, wherein the rotatable member is electrically conductively connected by a crimp barrel to a shield of the cable, wherein the shield surrounds an outer periphery of the second section of the rotatable member and is fixed to the rotatable member by the crimp barrel, the crimp barrel surrounding an outer jacket of the cable and positionally fixing the jacket to the rotatable member.

14. A position-measuring device comprising a scanning unit according to claim 1, and a scale associated with the scanning unit, the scale being adapted for position measurement in the measurement direction and extending the measurement direction.

15. The scanning unit as recited in claim 1, wherein the screw is accessible to be manipulated from a first outer surface of the housing which is opposite and parallel to a second outer surface of the housing having a scanning window.

* * * * *